(12) United States Patent
Weber

(10) Patent No.: US 6,223,530 B1
(45) Date of Patent: May 1, 2001

(54) CONTROL DEVICE FOR HYDRAULIC POWER CYLINDERS

(76) Inventor: Gisela Weber, Hauptplatz 23, A-2474, Gattendorf (AT)

(*) Notice: Subject to any disclaimer, the term of this patent is extended or adjusted under 35 U.S.C. 154(b) by 0 days.

(21) Appl. No.: 09/380,664
(22) PCT Filed: Mar. 6, 1998
(86) PCT No.: PCT/AT98/00057
§ 371 Date: Dec. 23, 1999
§ 102(e) Date: Dec. 23, 1999
(87) PCT Pub. No.: WO98/40239
PCT Pub. Date: Sep. 17, 1998

(30) Foreign Application Priority Data

Mar. 7, 1997 (AT) .................................................. 398/97

(51) Int. Cl.[7] ................................................ F16D 31/02
(52) U.S. Cl. ................................ 60/431; 91/1; 91/517
(58) Field of Search .................. 60/431, 477; 91/1, 91/511, 517

(56) References Cited

U.S. PATENT DOCUMENTS

| | | | |
|---|---|---|---|
| 3,788,076 | * 1/1974 | Lansky et al. | 60/431 X |
| 5,255,517 | * 10/1993 | Weber | 60/431 |
| 5,305,680 | 4/1994 | Weber | 91/1 |
| 5,317,870 | * 6/1994 | Ingawa | 60/431 X |
| 5,687,567 | * 11/1997 | Hansson et al. | 60/431 X |
| 5,944,159 | * 8/1999 | Scheneider et al. | 60/431 X |

FOREIGN PATENT DOCUMENTS 36 30 850   3/1988   (DE).

\* cited by examiner

*Primary Examiner*—John E. Ryznic
(74) *Attorney, Agent, or Firm*—Karl Hormann

(57) ABSTRACT

The invention relates to a control device for hydraulic power cylinders, in particular power cylinders of a road truck tailgate, comprising a hydraulic pump (1) driven by a motor (M). Said pump can be connected to a supply of medium and, via pump branch pipes, to a chamber of the operating cylinder (14) by means of allocated control valves (12,13). An adjustable electrical pressure gauge and switch unit (15–18) is connected to the chamber or corresponding pump branch pipe of the power cylinder. Said unit is fitted with a computer (15) for entering maximum pressure limits and used to stop the pump motor drive (2, 19) and activate a signal transmitter (20) when a preset maximum pressure is exceeded. In addition, a safety valve (22) set at a cut-in pressure lower than the preset maximum pressure is connected to the chamber or corresponding branch pipe (8",A, B) via an electromagnetic valve (23) which opens when the device is not operating.

5 Claims, 1 Drawing Sheet

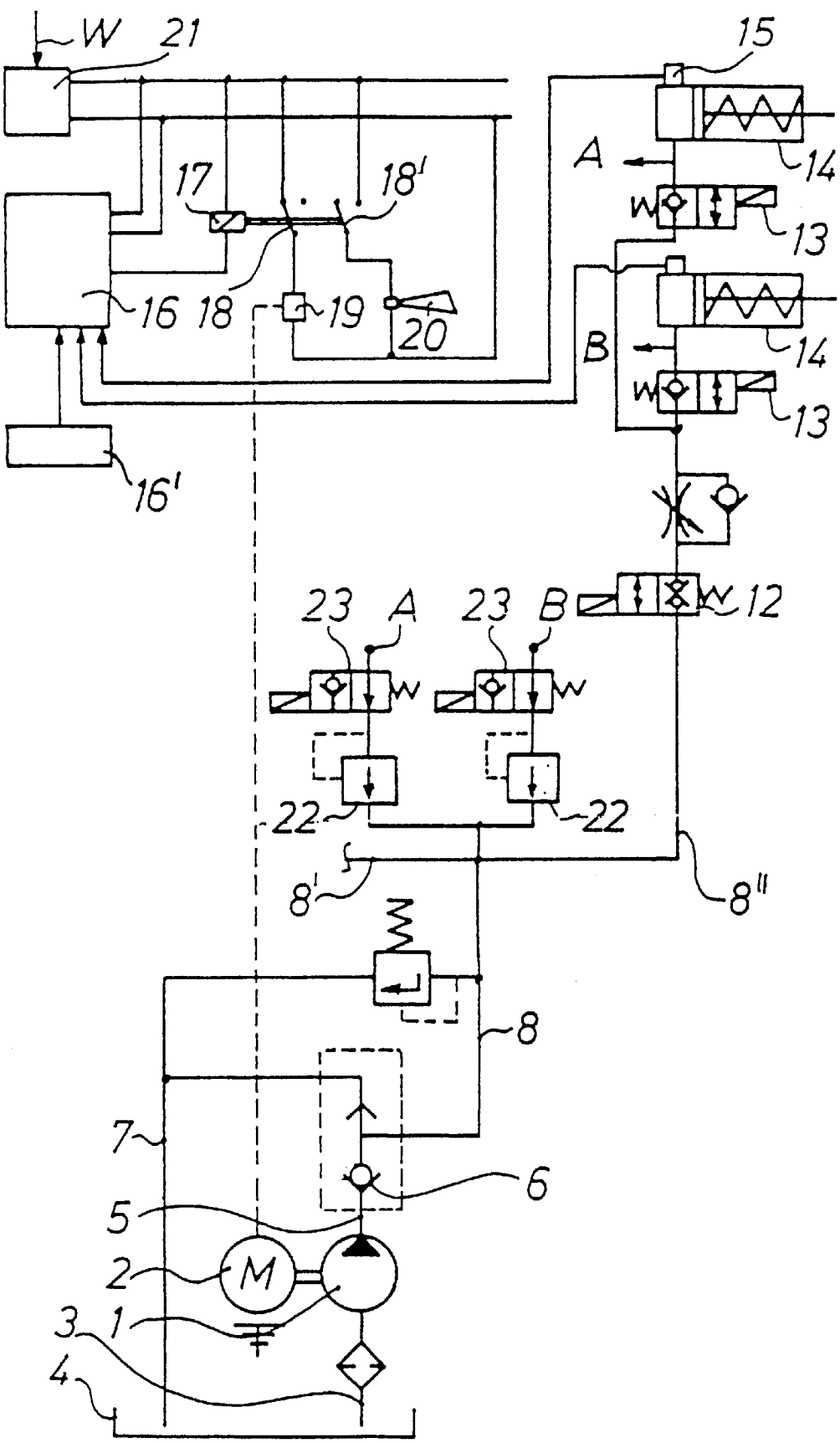

CONTROL DEVICE FOR HYDRAULIC POWER CYLINDERS

BACKGROUND OF THE INVENTION

1. Field of the Invention

The invention in general relates to a control device for hydraulic power cylinders, and, more particularly, to power cylinders for a tailgate of a truck, with a motor driven hydraulic medium pump which may be connected to a medium supply and, by way of pump branch conduits and associated control valves, to a chamber of the power cylinder.

2. The State of the Prior Art

When working with hitherto known control devices of this kind (U.S. Pat. No. 5,305,680), tilting moments pose a problem in that they subject the lifting arms and closing cylinders of the tailgate to increased tension or pressure forces when a load has been improperly positioned on a tailgate. This may, for instance, result in a five-fold increase of the permissible forces which may cause damage to, or destroy, the lifting arms and/or closing cylinder.

OBJECT OF THE INVENTION

The invention aims at providing a device of the kind referred to supra which alleviates the mentioned hazards.

SUMMARY OF THE INVENTION

In accordance with a preferred embodiment of the invention an adjustable electric pressure gauge and switching device provided with a computer for entering threshold pressure values is connected to the chamber or the corresponding pump branch conduit. When a predetermined pressure value is exceeded, the measuring and switching device switches off the pump motor and actuates a signal generator. Furthermore, a safety valve set at a lower opening pressure than the mentioned threshold pressure is connected to the chamber or corresponding pump branch conduit opened by a solenoid valve when the device is in an idle state.

The invention provides a simple structure which prevents, for instance, overloading of lifting arms or closing cylinder of a tailgate while generating a warning signal at the same time. The safety valve which is opened in the idle state of the device prevents overload indications when the pressure gauge and switching device is actuated as a result of the hydraulic circuit warming up as may happen when the vehicle is exposed in an idle state to the sun for an extended period, for such increased temperatures may lead to pressure increases of 10 bar/° C.

In accordance with the invention, the pressure gauge and switching device preferably is only connected to a source of electricity when the tailgate is in an open condition, or some other implement, for instance a crane, is in a loaded state, within an angle of inclination of ±15°.

Preferably, the electric pressure gauge and switching device actuates a counter for counting the number of times pressure has been exceeded.

DESCRIPTION OF THE DRAWING

The invention will hereinafter be described in more detail with reference to the sole drawing which depicts a hydraulic circuit diagram of a control device in accordance with the invention, for a tailgate of a truck.

DETAILED DESCRIPTION OF THE PREFERRED EMBODIMENT

As may be seen in the drawing, a hydraulic medium pump 1 is driven by an electric motor 2 and is connected to a source 4 of hydraulic medium by way of a conduit 3. By a pump conduit 5 including a shuttle valve 6, the pump 1 is also connected to a medium return conduit 7 and a conduit 8 leading to branch conduits 8' and 8". The branch 8' shown in FIG. 1 on the left side serves to feed two lifting cylinders (not shown) of a tailgate (also not shown).

In an analogous manner, the branch conduit 8" on the right feeds two power closing cylinders 14 by way of a controlled closing valve 12 and two control valves 13 associated with the closing cylinders 14.

A pressure sensor 15 of an adjustable electrical pressure gauge and switching device is connected to the larger chamber of the power cylinder 14. The device includes a schematically depicted computer 16 into which power cylinder pressure values, e.g. 250 bar, which are to be monitored, as well as their permissible overload ranges, e.g. 250–280 bar, are entered by means of a keypad 16'. If the threshold value of 280 bar is exceeded, the computer 16, by way of an output 18, energizes a relay 17 for deactivating the magnetic starter switch 19 of the pump motor M and for actuating a switch 18' associated with the relay for switching on a signal generator, such as, for example, an optical or acoustical indicator, preferably a horn 20.

It would be within the metes and bounds of the invention to arrange the depicted circuit such that the horn 20 is actuated before the magnetic starter switch 19 is opened. Advantageously, the pressure gauge and switching device may actuate a counter (not shown) for counting the number of times the pressure has been exceeded.

Preferably, the entire pressure gauge and switching device is in an active state only when the tailgate or some other load-bearing component, for instance a crane, is in an open state above or below a predetermined angle of inclination, for instance ±15°. For this purpose, a source of current 21 is actuated or switched on by a level switch (arrow W).

To prevent pressure from building up as a result of warming of the hydraulic circuit as may happen, for instance, when the device is exposed to the sun when in an idle state, which would result in an immediate overload indication, for instance, by actuating the horn 20, as soon as the system is turned on, a safety valve 22 provided with a return conduit leading to the sump 4 is connected by a solenoid valve 23 to the pump branch conduit 8" or, as here shown, to the terminal section of the pump branch conduit 8" associated with each power cylinder 14. The safety valve 22 is set at an opening pressure lower, e.g. by 20%, than the preset threshold pressure of the pressure gauge and switching device 15–18. In its idle state, the solenoid valve 23 is open, and it is closed when the source 21 of electricity is connected.

The invention is, of course, not limited to the described embodiment. For instance, the pressure sensor 15 may be connected directly to associated sections of the pump branch conduits 8" (points A, B). Alternatively, a single pressure sensor connected to the pump branch circuit 8" may be utilized if there are no closing cylinder valves 13 for disconnecting the power cylinders 14.

What is claimed is:

1. An apparatus for controlling a hydraulic power cylinder for moving a tailgate of a truck between closed and open positions, comprising:
   a source of hydraulic medium;
   a conduit for feeding hydraulic medium from the source to the cylinder;
   a pump for feeding hydraulic medium at a predetermined pressure through the conduit to the power cylinder for moving the tailgate;

an electric motor connected to a source of current for driving the pump;

a signal generator;

switch means connected to the conduit and responsive to pressure at a threshold value related to the predetermined pressure for disconnecting the motor from the source of current and for actuating the signal generator.

2. The apparatus of claim 1, further comprising means connected intermediate the switch means and the motor for storing the threshold value.

3. The apparatus of claim 1, further comprising means responsive to the position of the tailgate for connecting the source of power to the switch means only in the open condition of the tailgate.

4. The apparatus of claim 2, wherein the switch means comprises a pressure gage provided with an output connected to the input of the storing means and wherein the motor comprises a relay having an input connected to the output of the storing means and an output connected to the motor.

5. The apparatus of claim 4, wherein the motor is provided with a starter switch actuated by the relay.

* * * * *